(12) United States Patent
Takata

(10) Patent No.: US 8,725,958 B2
(45) Date of Patent: May 13, 2014

(54) METHODS AND SYSTEMS FOR MAINTAINING CACHE COHERENCY IN MULTI-PROCESSOR SYSTEMS

(75) Inventor: Hirokazu Takata, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 571 days.

(21) Appl. No.: 13/009,482

(22) Filed: Jan. 19, 2011

(65) Prior Publication Data

US 2011/0179226 A1 Jul. 21, 2011

(30) Foreign Application Priority Data

Jan. 19, 2010 (JP) ................................. 2010-009234

(51) Int. Cl.
*G06F 12/08* (2006.01)

(52) U.S. Cl.
USPC ..... 711/152; 711/145; 711/146; 711/E12.026

(58) Field of Classification Search
None
See application file for complete search history.

(56) References Cited

U.S. PATENT DOCUMENTS

| 5,335,335 | A | * | 8/1994 | Jackson et al. ................. 711/121 |
| 5,706,485 | A | * | 1/1998 | Barkatullah et al. ........... 713/401 |
| 5,860,159 | A | * | 1/1999 | Hagersten ..................... 711/151 |
| 6,684,278 | B1 | * | 1/2004 | Sakugawa et al. ............. 711/154 |
| 7,249,270 | B2 | * | 7/2007 | Mansell et al. ................ 711/100 |
| 2001/0034827 | A1 | * | 10/2001 | Mukherjee et al. ............ 711/126 |
| 2003/0065704 | A1 | * | 4/2003 | Buch ............................ 709/107 |
| 2005/0246506 | A1 | | 11/2005 | Ukai |
| 2006/0161735 | A1 | | 7/2006 | Kiyota et al. |
| 2008/0177955 | A1 | * | 7/2008 | Su ................................ 711/154 |
| 2008/0294849 | A1 | * | 11/2008 | Uchida ......................... 711/144 |
| 2011/0161599 | A1 | * | 6/2011 | Craske ......................... 711/141 |

FOREIGN PATENT DOCUMENTS

| JP | 2005-316854 | | 11/2005 |
| JP | 2005-327086 | | 11/2005 |
| JP | 2005327086 | A * | 11/2005 |
| JP | 2006-155204 | | 6/2006 |
| JP | 2009-116885 | A | 5/2009 |

OTHER PUBLICATIONS

"Pause-Spin Loop Hint," IA-32 Intel Architecture Software Developer's Manual, vol. 2: Instruction Set Reference, p. 3-544.
Intel Application Note AP-949, "Using Spin-Loops on Intel Pentium 4 Processor and Intel Xeon Processor."
Japanese Office Action with English translation issued in Japanese Application No. 2010-009234 issued on Oct. 1, 2013.

* cited by examiner

*Primary Examiner* — Michael Krofcheck
(74) *Attorney, Agent, or Firm* — McDermott Will & Emery LLP

(57) ABSTRACT

The present invention provides a data processor capable of reducing power consumption at the time of execution of a spin wait loop for a spinlock. A CPU executes a weighted load instruction at the time of performing a spinlock process and outputs a spin wait request to a corresponding cache memory. When the spin wait request is received from the CPU, the cache memory temporarily stops outputting an acknowledge response to a read request from the CPU until a predetermined condition (snoop write hit, interrupt request, or lapse of predetermined time) is satisfied. Therefore, pipeline execution of the CPU is stalled and the operation of the CPU and the cache memory can be temporarily stopped, and power consumption at the time of executing a spin wait loop can be reduced.

11 Claims, 15 Drawing Sheets

FIG. 3

```
/*lockvar == 1 : unlock
 *         < 0 : lock
 */ void spin_lock(spinlock_t *lockvar)
{
   for (; ;) {                    //outer spin-wait loop
      atomic_dec(lockvar) ;       //*lockvar -= 1; (atomic)
      if (*lockvar == 0)
         break ;                  //exit from outer spin-wait loop
      while (*lockvar <= 0)
         ;                        //inner spin wait loop
   }
} void spin_unlock(volatile spinlock_t *lockvar)
{
   *lockvar = 1 ;
}
```

L1 encompasses the for loop; L2 encompasses the while loop.

FIG. 4

```
spin_lock :
    mvfc      r1, psw
    clrpsw    #0x40           ; disable interrupt
    LOCK      r0, @r2
    addi      r0, #-1
    UNLOCK    r0, @r2
    mvtc      r1, psw
    beqz      r0, spin_lock_end
spin_wait_loop :
    LD        r0, @r2
    bgtz      r0, spin_lock
    bra       spin_wait_loop
spin_lock_end :
```

L1 encompasses spin_lock through beqz; L2 encompasses spin_wait_loop block.

```
spin_lock :
    mvfc      r1, psw
    clrpsw    #0x40          ; disable interrupt
L1  lock      r0, @r2
    addi      r0, #-1
    unlock    r0, @r2
    mvtc      r1, psw
    beqz      r0, spin_lock_end
spin_wait_loop :
L2  LDS       r0, @r2
    bgtz      r0, spin_lock
    bra       spin_wait_loop
spin_lock_end :
```

FIG. 17

```
spin_lock :
    mvfc      r1, psw
    clrpsw    #0x40         ; disable interrupt
L1  lock      r0, @r2
    addi      r0, #-1
    unlock    r0, @r2
    mvtc      r1, psw
    beqz      r0, spin_lock_end
L2  SPIN      #0, @r2       ; spin wait
    bra       spin_lock
spin_lock_end :
```

METHODS AND SYSTEMS FOR MAINTAINING CACHE COHERENCY IN MULTI-PROCESSOR SYSTEMS

CROSS-REFERENCE TO RELATED APPLICATIONS

The disclosure of Japanese Patent Application No. 2010-9234 filed on Jan. 19, 2010 including the specification, drawings and abstract is incorporated herein by reference in its entirety.

BACKGROUND OF THE INVENTION

The present invention relates to a spinlock method for interprocess exclusive control in a shared-memory multi-processor (multicore) system and, more particularly, relates to a multi-processor system realizing reduced power consumption in a spinlock operation by control of a cache memory.

In recent years, a cache memory is often mounted on a microcomputer in order to increase processing speed. When a processor accesses a main storage via the cache memory, the processing speed at the time of a cache hit can be improved.

In a multi-processor system including a plurality of such processors, the processors are connected to a common bus via cache memories and can access data in a common memory connected to the common bus.

In a multi-processor, particularly, a symmetric multi-processor, it is important that processors perform processing while obtaining coherency in data among cache memories for data on a common memory as a common resource for the processors.

A protocol for maintaining coherency in data among cache memories is called a cache coherency protocol which is largely classified to an invalidation protocol and updating protocol. In a relatively small-sized multiprocessor having not more than tens of processors, the invalidation protocol in which the configuration is relatively simple is often employed.

Representative cache coherency protocols of the invalidation type include a write-once protocol and the MESI protocol. In the invalidation-type protocols, use of a snoop cache of an instruction data separation type having a bus snoop function is a precondition. When a write miss in a cache occurs, by invalidating a cache line in another cache which is snoop-hit, coherency between the caches can be maintained.

In a multiprocessor system, a plurality of processors perform processes in parallel while obtaining synchronization. For exclusive control and synchronization control among processes and threads, exclusive control using a lock is necessary.

In a single-processor system, an exclusive control among processes/threads for a critical section can be easily realized by inhibiting an interruption during the critical section. In a multiprocessor system, however, even when an interruption is inhibited, there is the possibility that another processor executes a critical section. Consequently, it is insufficient to just inhibit an interruption but is necessary to perform a lock process among processes/threads.

The lock process is a process of locking a common resource, after a processor obtains the lock, executing a critical section, accessing the common resource, and unlocking the common resource. A spinlock is generally used in such a lock process and is a lock where a processor trying to obtain a lock performs a busy loop (spin) in a lock wait state, thereby obtaining a lock at high speed.

Related arts include the inventions disclosed in the following patent documents 1 to 3 and techniques disclosed in non-patent documents 1 and 2.

Patent document 1 is directed to reduce waste in power consumption and processor resources caused by a spin loop for exclusive control among a plurality of logical or physical processors. To monitor a shared variable [A] for the exclusive control, a load-with-lookup instruction for setting a trigger to start monitoring a trial of loading a target shared variable [A] and a store event is provided. A CPU issues the load-with-lookup instruction after failure in acquisition by CAS[A], monitors storage to a lock variable [A] (free access from another CPU), shifts to a suspend state in response to a suspend instruction, recovers using, as a trigger, detection of possibility of storage of the lock variable [A] from another CPU, and can try re-acquisition of the lock variable [A]. Therefore, a useless spin loop (idling) can be prevented.

Patent document 2 is directed to provide a multi-thread controlling apparatus and method capable of efficiently switching a plurality of threads in a multi-thread processor capable of executing a plurality of threads. The multi-thread controlling apparatus has a plurality of thread processing means. By executing a synchronous lock control such that, in the case where, during execution of certain thread processing means, a specific block in a cache is updated by another processor or another thread processing means, it is regarded that the right to exclusion for the thread processing means is open, a plurality of threads are efficiently switched.

Patent document 3 is directed to provide a semiconductor integrated circuit device capable of reducing power consumption of a CPU in a loop state and maintaining high-performance process without influencing the performance of the CPU which is performing processing. In a multi-processor system employing a spinlock as a system for performing an exclusive control between CPUs, a spinlock detector is coupled to each of first and second CPUs. When a spinlock state is detected by the spinlock detector, an inversion spinlock flag bar SLF0 and a bar SLF1 are output and supplied to two AND circuits. To the two AND circuits, memory access request signals RQ0 and RQ1 are also supplied. Outputs M0 and M1 of AND operation with the inversion spinlock flag bar SLF0 and the bar SLF1 are supplied to two cache memories.

The non-patent documents 1 and 2 relate to reduction in power consumption in a spin wait state in a spinlock. By inserting a pause instruction into a spin wait loop, a very small delay is inserted in the spin wait loop. It suppresses excessive operation of a hardware resource of the processor during a loop wait state, so that power consumption during execution of a spin loop is reduced.

By the pause instruction, a processor is notified of a hint that a spin wait loop is being executed so that simultaneous issue of a plurality of memory accesses and execution of out-of-order process are suppressed. Consequently, an accurate read access order of lock variables is assured and, by reducing hardware resources of processors operating simultaneously, power consumption is suppressed.

RELATED ART DOCUMENTS

Patent Documents

Patent Document 1

Japanese Unexamined Patent Publication No. 2005-316854

Patent Document 2

Japanese Unexamined Patent Publication No. 2006-155204

Patent Document 3

Japanese Unexamined Patent Publication No. 2005-327086

Non-Patent Document

Non-Patent Document 1

"PAUSE-Spin Loop Hint", IA-32 Intel®, Architecture Software Developer's Manual, Volume 2: Instruction Set Reference, p. 3-544.

Non-Patent Document 2

Intel® Application Note AP-949, "Using Spin-Loops on Intel®, Pentium®, 4 Processor and Intel®, Xeon® Processor"

SUMMARY OF THE INVENTION

In the spinlock, until a lock can be assured, a processor is executing a spin wait loop. In the spin wait loop, a spin is performed in a state where a read hit occurs in a cache memory in reading of a lock variable by a processor. Consequently, in a spin wait state, the processor and the cache memory operate at high speed and wait for release of a lock by another processor while consuming large power. There is consequently a problem such that the processor consumes power vainly without performing any useful processes in the spin wait state.

As disclosed in the non-patent documents 1 and 2, by inserting an instruction for making a process wait into a spin wait loop, average power consumption at the time of waiting for a spin can be reduced to a certain degree. However, when the interval of reading lock variables is set be excessively large, a problem arises such that the spinlock performance deteriorates. Since time to obtain a lock in a spinlock varies according to a process in an application program to be executed or a load on a system, it is also difficult to select optimum wait time.

The present invention is directed to solve the problems and an object of the invention is to provide a data processor realizing reduced power consumption at the time of execution of a spin wait loop for a spinlock.

According to an embodiment of the invention, a data processor in which a plurality of CPUs are coupled to a common memory via a cache memory and cache coherency is maintained is provided. When a weighted load instruction is executed at the time of performing a spinlock process, a CPU outputs a spin wait request to a corresponding cache memory. When the spin wait request is received from the CPU, the cache memory temporarily stops outputting an acknowledge response to a read request from the CPU until a predetermined condition (snoop write hit, interrupt request, or lapse of predetermined time) is satisfied.

In the embodiment, when the cache memory receives the spin wait request from the CPU, the cache memory temporarily stops outputting the acknowledge response to the read request from the CPU until the predetermined condition is satisfied. Consequently, pipeline execution of the CPU is stalled and the operation of the CPU and the cache memory can be temporarily stopped, and power consumption at the time of executing a spin wait loop can be reduced.

BRIEF DESCRIPTION OF DRAWINGS

FIG. 3 is a diagram showing a pseudo-code in a general spinlock process executed by CPUs 0 to 7 (10-0 to 10-7).

FIG. 4 is a diagram showing another example of the code in the spinlock process.

FIG. 17 is a diagram showing an example of a spinlock process code executed by the CPU 21 in a second embodiment of the invention.

DETAILED DESCRIPTION OF PREFERRED EMBODIMENTS

Figure 1:
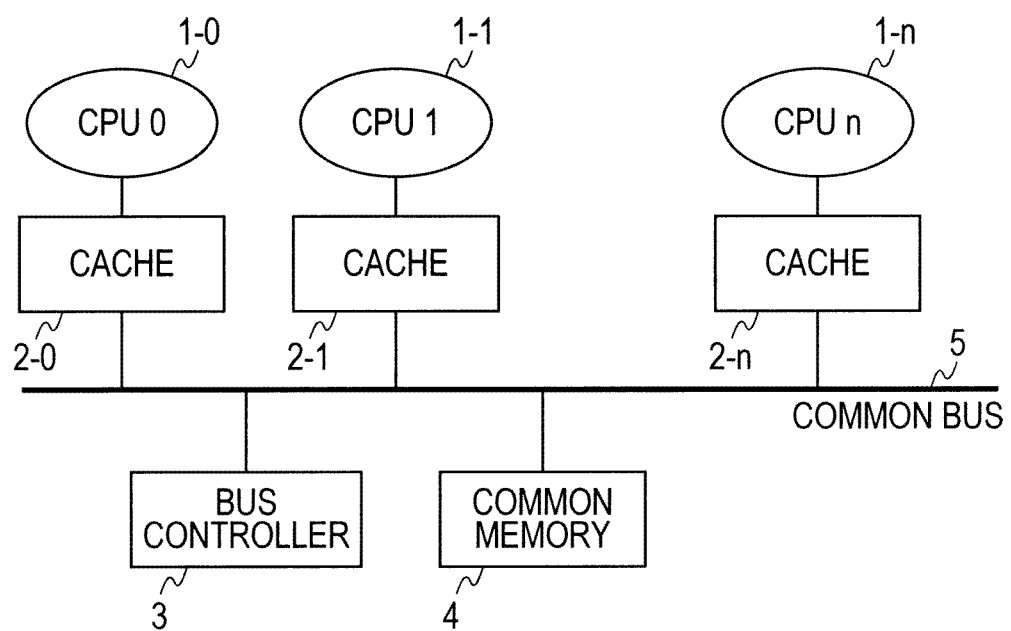
FIG. 1 is a block diagram showing a configuration example of a shared-memory multi-processor system.

FIG. 1 is a block diagram showing a configuration example of a shared-memory multi-processor system. The system includes CPUs 0 to n (1-0 to 1-n), caches 2-0 to 2-n coupled to the CPU 0 to CPU n, respectively, a bus controller 3, and a common memory 4.

The CPUs 0 to n (1-0 to 1-n) are coupled to a common bus 5 via the caches 2-0 to 2-n and perform computing process while accessing the common memory 4 or the like as a common resource. The CPUs 0 to n (1-0 to 1-n) access the common memory 4 via the caches 2-0 to 2-n, and the caches 2-0 to 2-n hold a copy of data accessed in the common memory 4. Consequently, the CPUs 1-0 to 1-n can access the copy of data at high speed in the caches 2-0 to 2-n, so that the bus traffic in the common bus 5 is reduced, and the process performance of the entire system can be improved.

The bus controller 3 adjusts access requests to the common memory 4 from the caches 0 to n (2-0 to 2-n) and controls a lock process. The value of a lock variable is written in the common memory 4 by the bus controller 3, and the CPUs 0 to n (1-0 to 1-n) access the common memory 4 to obtain the lock variable.

Figure 2:
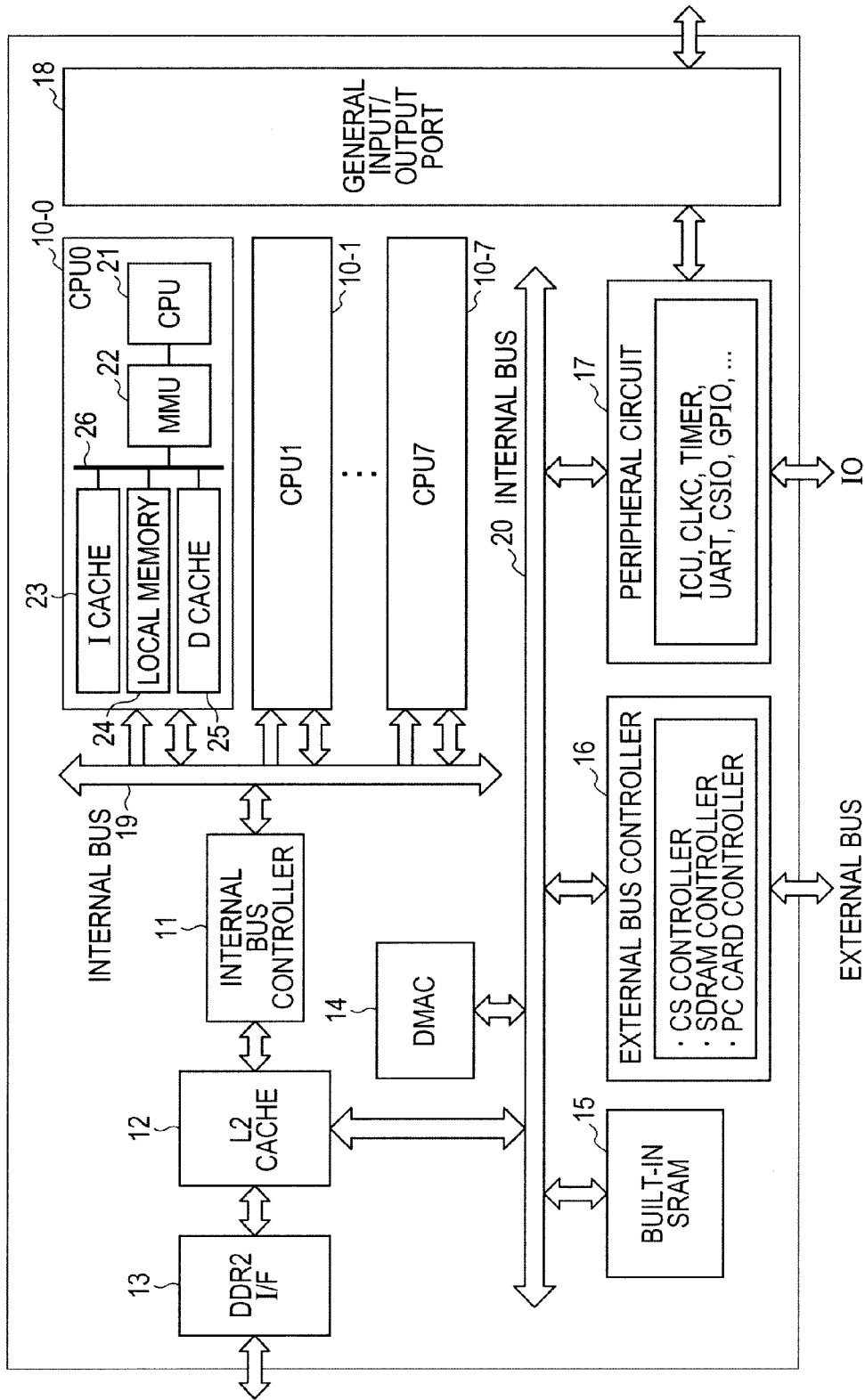
FIG. 2 is a block diagram showing a concrete example of the configuration of the shared-memory multi-processor system.

FIG. 2 is a block diagram showing a concrete example of the configuration of the shared-memory multi-processor system. The multi-processor system is realized by, for example, a single semiconductor device and includes eight CPUs 0 to 7 (10-0 to 10-7), an internal bus controller 11, an L2 cache (secondary cache) 12, a DDR (Double Data Rate) 2 I/F (Interface) 13, a DMAC (Dynamic Memory Access Controller) 14, a built-in SRAM (Static Random Access Memory) 15, an external bus controller 16, a peripheral circuit 17, and a general input/output port 18.

Each of the CPUs 0 to 7 (10-0 to 10-7) includes a CPU 21, an MMU (Memory Management Unit) 22, an I cache (instruction cache) 23, a local memory 24, and a D cache (data cache) 25.

The CPU 21 is coupled to the I cache 23, the local memory 24, and the D cache 25 via the MMU 22 and a processor bus 26 and can access the caches and the memory at high speed.

The processor bus 26 has a Harvard configuration in which an instruction and data are separated. An instruction is stored in the I cache 23, and data is stored in the D cache 25. The local memory 24 holds local data which is not stored in a memory on the outside of the CPU, such as the common memory 4.

The CPUs 0 to 7 (10-0 to 10-7) are coupled to the internal bus controller 11 via an internal bus 19. The internal bus controller 11 receives an access request and executes it and adjusts accesses in the case where a cache miss occurs in the CPUs 0 to 7 (10-0 to 10-7) or in the case where the CPUs 0 to 7 (10-0 to 10-7) accesses IO (input Output) circuits such as the peripheral circuits 17.

The internal bus controller 11 performs a snoop control on the CPUs 0 to 7 (10-0 to 10-7) and coherency of the D cache 25 of the CPUs 0 to 7 (10-0 to 10-7) is maintained.

The L2 cache 12 receives an access request from the CPUs 0 to 7 (10-0 to 10-7) via the internal bus controller 11 and accesses an DDR SDRAM (Synchronous Dynamic Random Access Memory) coupled to the DDR2 I/F 13, the built-in SRAM 15, various ROM (Read Only Memory) devices (such as a flash ROM and an EEPROM) and RAM devices (such as SDRAM and SRAM) on an external bus coupled to the external bus controller 16, and memory devices and the like on a PC card. The L2 cache 12 holds a copy of the data accessed by the CPUs 0 to 7 (10-0 to 10-7).

The common memory 4 shown in FIG. 1 corresponds to the built-in RAM 15 and a memory coupled to an external terminal of the semiconductor device. Those memories will be also generically called the common memory 4.

In response to a DMA transfer request from the CPUs 0 to 7 (10-0 to 10-7), the DMAC 14 controls a DMA transfer between memories such as the common memory 4 or a DMA transfer between the IO terminals of the peripheral circuit 17 or the like and the memory.

The external bus controller 16 is coupled to a device on the outside of the semiconductor chip via the external bus and has the functions of a CS (Chip Select) controller, an SDRAM controller, a PC card controller, and the like.

The peripheral circuit 17 has the functions of an ICU (Interrupt Control Unit), a CLKC (Clock Controller), a timer, a UAER (Universal Asynchronous Receiver Transmitter), a CSIO, a GPIO (General Purpose Input Output), and the like. The general input/output port 18 is coupled to an I/O port on the outside of the semiconductor chip.

FIG. 3 is a diagram showing an example of a pseudo code of a general spinlock process executed by the CPUs 0 to 7 (10-0 to 10-7). In principle, it is sufficient to simply check a lock variable atomically and execute a spin wait loop until a lock is obtained. However, when common data is atomically accessed each time, traffic in the bus is increased and a penalty at the time of execution becomes large. Therefore, usually, the loop is doubled like L1 and L2 as shown in FIG. 3.

In FIG. 3, when the lock variable (lockvar) is "1", it shows an unlock state. When the lock variable is smaller than "0", it shows a lock state. In the loop L1 on the outside, the lock variable is read atomically and decremented. When the value of the lock variable is "0", that is, the unlock state is obtained, the program exits from the spin wait loop.

When no lock is obtained, the lock variable is read in the spin wait loop on the inside shown by L2, and whether a lock is obtained or not is checked. When the lock variable becomes "1", the program atomically tries again to obtain a lock state in the loop on the outside shown by L1.

In a cache coherency protocol such as an MESI protocol, the cache memory is continuously read and hit by a process of reading a lock variable in the spin wait loop on the inside indicated by L2. Consequently, a useless access does not occur on the common bus 5 also in a situation that a plurality of CPUs wait for a spin in the spinlock, and the influence on the system performance can be minimized.

FIG. 4 is a diagram showing another example of a code of the spinlock process. In a register r2, an address on the common memory 4 in which the lock variable is stored is stored. In the loop L1 on the outside, first, the value of a psw (processor status word) is transferred to inhibit interruption.

Next, in response to a LOCK instruction, the lock variable is loaded atomically and stored in a register r0. "−1" is added to the value of r0, and the value of r0 is saved as the lock variable in response to an UNLOCK instruction. During the period since execution of the LOCK instruction until execution of the UNLOCK instruction, a critical section can be exclusively accessed.

Next, the value of r1 is reset to psw. When the value of r0 is "0", it is regarded that the lock state is obtained, and the instruction is branched to spin lock end. In the case where the lock state is not obtained, a lock variable is read in the spin wait loop on the inside indicated by L2, and whether a lock state is obtained or not is checked.

In L2, first, the value of the lock variable is loaded to r0 in response to a normal load instruction. When the value of r0 is larger than "0", it is expected that the lock state is obtained, the instruction is branched to spin lock, and an attempt to atomically obtain the lock state in the loop on the outside indicated by L1 is made again. If not, the instruction is branched to spin wait loop, and the loop L2 on the inside is performed. In a manner similar to the description of FIG. 3, the cache memory is continuously read and hit by the process of reading a lock variable in the spin wait loop on the inside indicated by L2.

Figure 5:
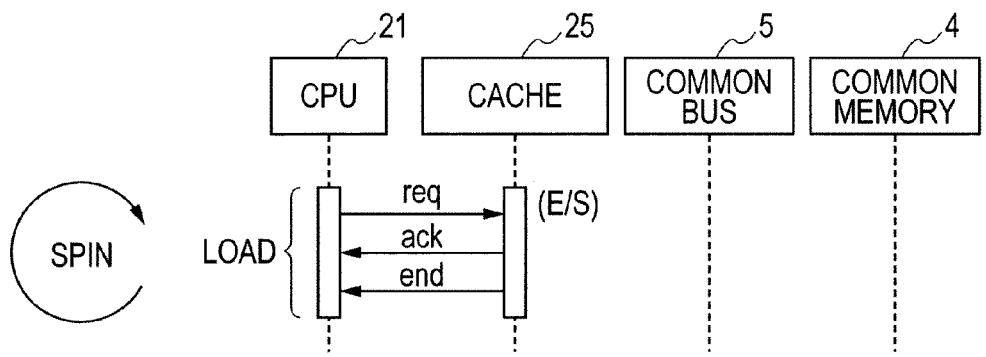
FIG. 5 is a diagram showing a sequence of a lock variable loading process in response to a normal load instruction (LD instruction) illustrated in FIG. 4.

FIG. 5 is a diagram showing a sequence of the load process of a lock variable in response to the normal load instruction (LD instruction) shown in FIG. 4. When the CPU 21 executes the LD instruction, the CPU 21 transmits a memory read request (req) signal to the cache 25. When the request is received from the CPU 21, the cache 25 sends an acknowledge (ack) signal to notify reception of the request to the CPU 21. Since a copy of the lock variable is stored mainly in the D cache 25, the D cache 25 will be simply described as a cache or a cache memory.

Since the lock variable is stored in the cache 25 and a cache hit occurs, the cache 25 transmits load data (lock variable) together with an end signal to the CPU 21 without accessing the common memory 4, and completes the transaction. The CPU 21 confirms that the end signal is asserted, receives load data, and continues subsequent processes in the program.

In an MESI protocol, the state of a cache line is expressed in four states of M (Modified), E (Exclusive), S (Shared), and I (Invalid) states, and maintains cache coherency. As described with reference to FIG. 4, until a lock state is assured, the CPU is continuously executing the spin wait loop.

At this time, the cache line is in the E or S state in which a valid copy is registered, so that a spin occurs in a state where the cache 25 is read and hit in the operation of reading the lock variable by the CPU 21. Consequently, while waiting for a spin, the CPU 21 and the cache 25 operate at extremely high speed. While consuming high power, cancelling of the lock by another CPU is waited.

The data processor in the embodiment of the invention is provided with the mechanism for realizing efficient spinlock by reducing power consumption at the time of executing a spin wait loop for a spinlock.

First Embodiment

Figure 6:
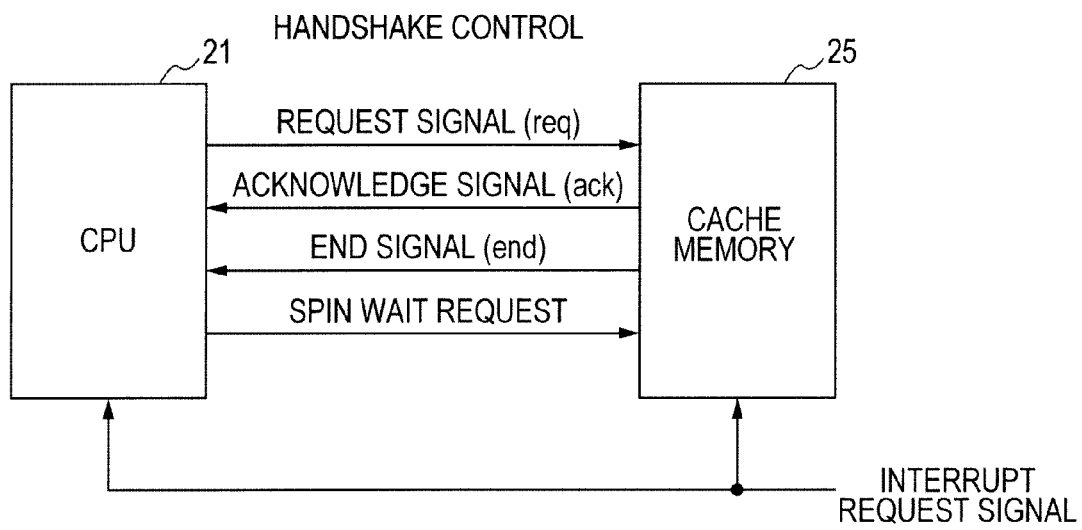
FIG. 6 is a diagram showing a coupling example of a CPU 21 and a cache memory 25 in the data processor in the first embodiment of the invention.

FIG. 6 is a diagram showing an example of connection between the CPU 21 and the cache memory 25 in the data processor according to the first embodiment of the invention. The CPU 21 and the cache memory 25 are coupled by handshake signals such as a request (req) signal, an acknowledge (ack) signal, and an end signal. By performing the handshake control by the CPU 21, a memory access process is performed with reliability.

The CPU 21 outputs a spin wait request signal to the cache memory 25 at the time of executing a weighted load instruction (LDS instruction) or a spin wait instruction (SPIN instruction) which will be described later. To the cache memory 25, an interrupt request signal is coupled. The details of them will be described later.

Figure 7:
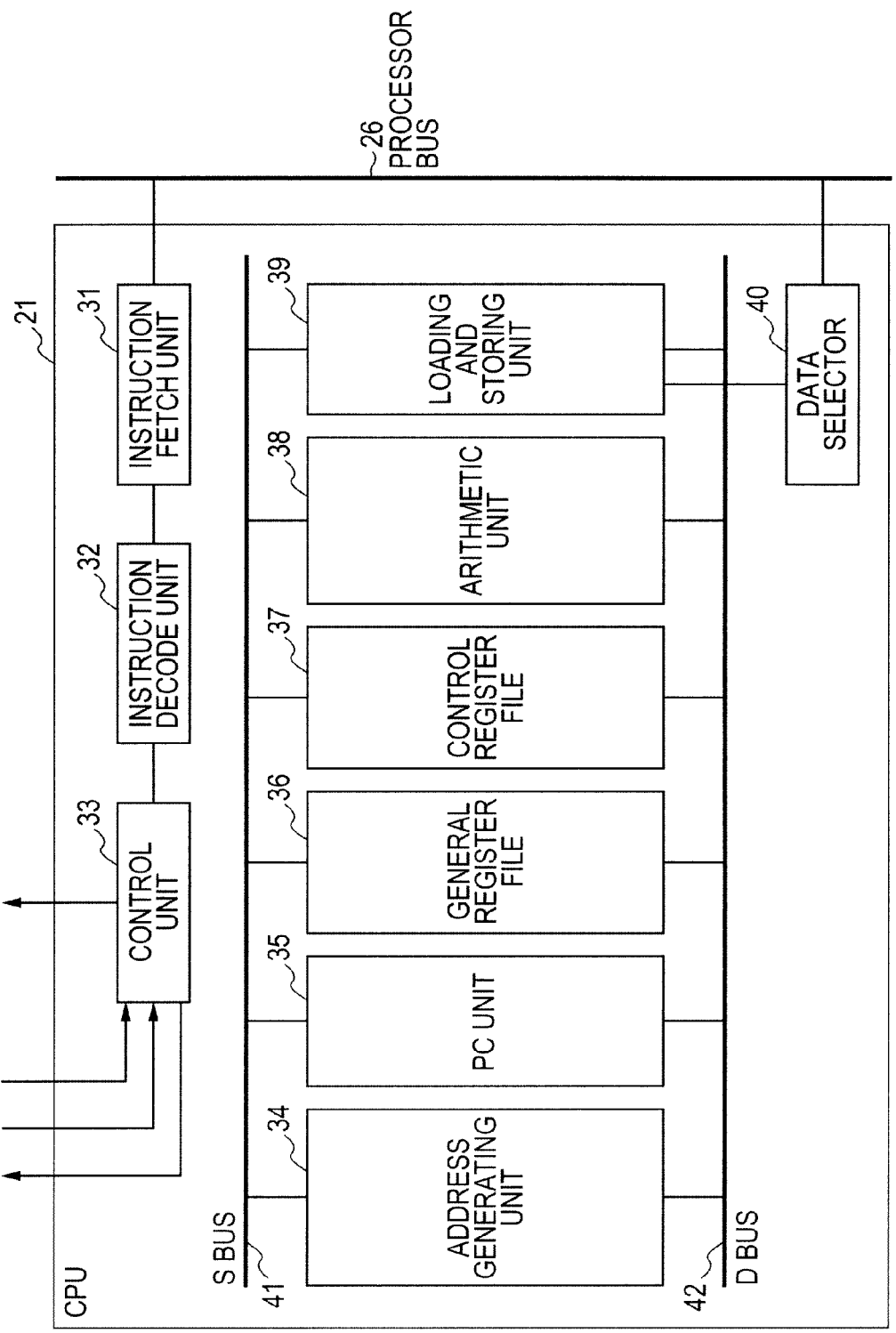
FIG. 7 is a block diagram showing a configuration example of the CPU 21 in the data processor in the first embodiment of the invention.

FIG. 7 is a block diagram showing a configuration example of the CPU 21 in the data processor in the first embodiment of the invention. The CPU 21 includes an instruction fetch unit 31, an instruction decode unit 32, a control unit 33, an address generating unit 34, a PC (Program Counter) unit 35, a general register file 36, a control register file 37, a computing unit 38, a loading and storing unit 39, and a data selector 40 which are coupled to a processor bus 26, an S bus 41, and a D bus 42. The units can transmit/receive data, an address, a control signal, and the like via the buses.

The instruction fetch unit 31 fetches an instruction code stored in the common memory 4 and the like via the I cache 23 in accordance with the program counter value of the PC unit 35 and outputs the instruction code to the instruction decode unit 32.

The instruction decode unit 32 decodes the instruction code received from the instruction fetch unit 32 and outputs a result of the decoding to the control unit 33. When the instruction decode unit 32 decodes a weighted load instruction (LDS instruction) or a spin wait instruction (SPIN instruction), the control unit 33 outputs the spin wait request signal to the cache memory 25.

The control unit 33 controls the components of the CPU 21 in accordance with the decoding result received from the instruction decode unit 32, thereby controlling and managing the operation of the CPU 21. In FIG. 7, control signals output from the control unit 33 to the components are not shown.

When the branch instruction is decoded by the instruction decode unit 32, the address generating unit 34 calculates a calculated branch destination address in accordance with an addressing mode. When a branch condition is satisfied, the calculated branch destination address is set in the PC unit 35.

The arithmetic unit 38 performs arithmetic process on data stored in the general register file 36, data read from the common memory 4, and the like by the control of the control unit 33. The arithmetic result is written in the general register file 36, the common memory 4, the cache memory 25, and the like.

The loading and storing unit 39 stores the arithmetic result and the like of the arithmetic unit 38 into the cache memory 25, and loads data from the common memory 4 and the cache memory 25. The loading and storing unit 39 generates an operand access address and outputs it to the cache memory 25 via the data selector 40.

The data selector 40 outputs an operand access address and write data output from the loading and storing unit 39 to the processor bus 26, and outputs the read data received via the processor bus 26 to the loading and storing unit 39.

Figure 8:
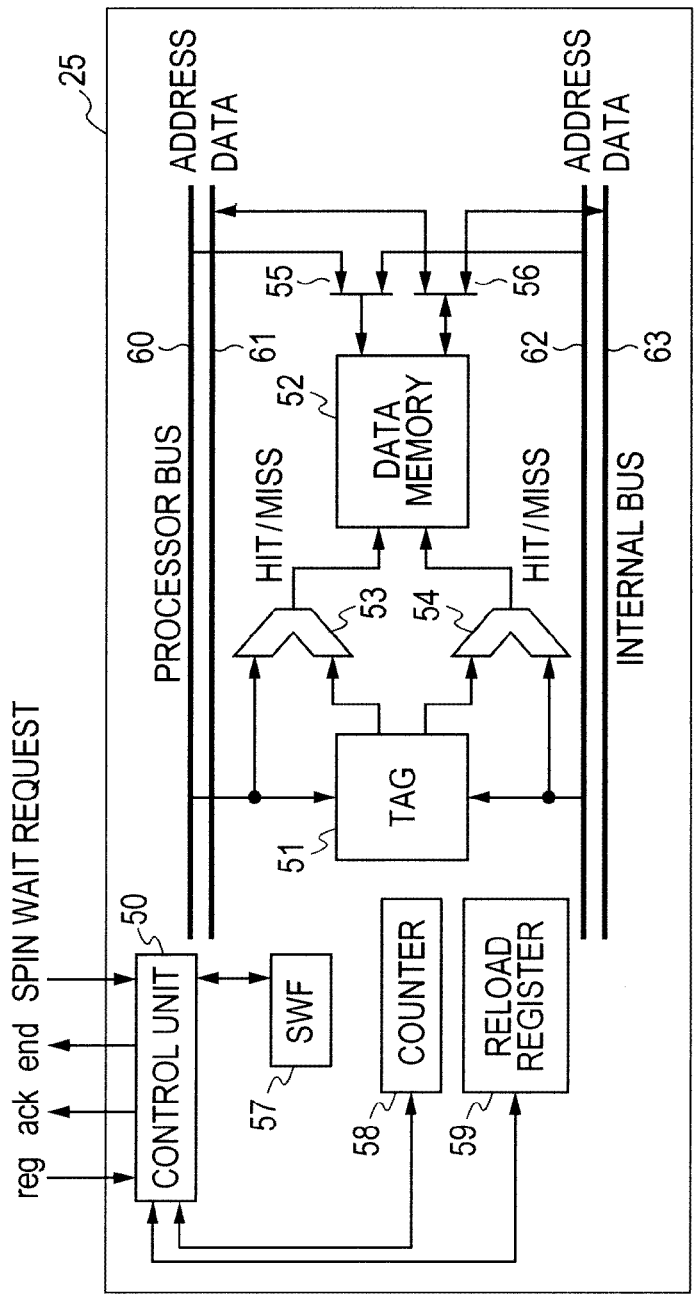
FIG. 8 is a block diagram showing a configuration example of the cache memory 25 in the data processor in the first embodiment of the invention.

FIG. 8 is a block diagram showing a configuration example of the cache memory 25 in the data processor in the first embodiment of the present invention. The cache memory 25 is a snoop cache having a bus snoop mechanism, and includes a control unit 50 for performing a general control on the cache memory 25, a tag 51, a data memory 52, comparators 53 and 54, selectors 55 and 56, a spin-wait flag SWF 57 for controlling a spin wait state, a counter 58, and a reload register 59 for setting the number of wait cycles.

The control unit 50 performs spin wait control while controlling the SWF 57, the counter 58, and the reload register 59 except for performing the handshake control and the bus snoop control.

The tag 51 holds an upper address corresponding to a cache line in which data is stored in the data memory 52. The data memory 52 holds a copy of data loaded from the common memory 4.

The tag 51 is coupled to an address 60 of the processor bus and an address 62 of the internal bus. The data memory 52 is coupled to the address and data of the processor bus and the address 62 and data 63 of the internal bus. With such a configuration, data is referred in a cache access from the CPU 21 of the apparatus itself and, in addition, can be accessed from the internal bus side for a snoop access from another CPU 21.

The comparator 53 compares the upper address in the address 60 of the processor bus with the address stored in the tag 51, thereby determining a cache hit/miss for an access of the CPU 21 of the apparatus. The comparator 54 compares the upper address in the address 62 of the internal bus with the address stored in the tag 51, thereby determining a cache hit/miss for a snoop access from another CPU 21.

When a cache hit occurs, the data memory 52 writes/reads the data 61 of the processor bus or the data 63 of the internal bus in accordance with a lower address in the address 60 of the processor bus or the address 62 of the internal bus.

Figure 9:
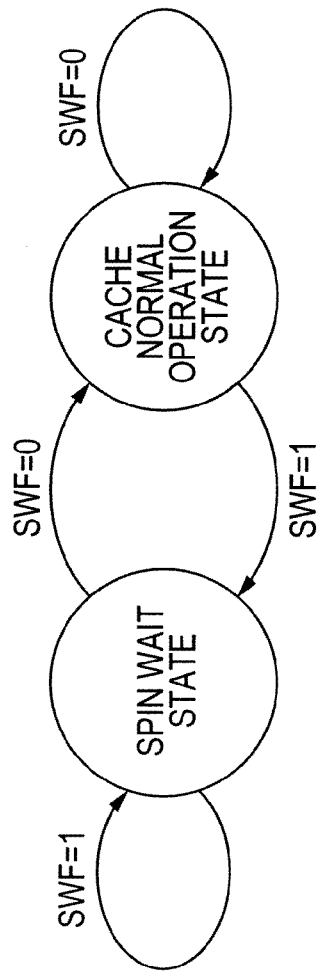
FIG. 9 is a diagram for explaining a state transition of the cache memory 25 in the first embodiment of the invention.

FIG. 9 is a diagram for explaining a state transition of the cache memory 25 in the first embodiment of the invention. When a spin wait request from the CPU 21 is received in the normal operation state, the control unit 50 in the cache memory 25 sets the spin-wait flag SWF 57 to "1" and shifts to the spin wait state. When the spin wait request from the CPU 21 is cancelled, the control unit 50 resets the SWF 57 to "0" and returns to the normal operation state.

In the embodiment, by stopping a response from the control unit 50 in the cache memory 25 to the memory read request from the CPU 21 in the spin wait process in the spin lock, a pipeline execution of the CPU 21 is stalled and the operation of the CPU 21 and the cache memory 25 in the spin wait state is temporarily stopped.

When the CPU 21 executes a spin wait instruction, the cache memory 25 shifts to a spin wait state. When the CPU 21 performs a loading process for reading a lock variable, since the cache memory 25 is in the spin wait state, no acknowledge response is sent from the CPU 21 to a read request to the cache memory 25. Consequently, the pipeline between the CPU 21 and the cache memory 25 is stalled, and the operation of the CPU 21 and the cache memory 25 stops temporarily.

Also in the spin wait state, the CPU 21 accepts the interrupting process for the following reasons. Depending on a system, a CPU 21 has a peculiar peripheral IO. Consequently, depending on the kind of an interruption, there is a process which can be performed only by a specific CPU 21. To increase the speed of the interrupt process, it is desirable that a CPU which receives an interrupt request performs the interrupt process.

As shown in FIGS. 6 and 8, an interrupt request signal is coupled to the cache memory 25. By receiving the interrupt request and cancelling the spin wait state, the CPU 21 can restart the operation and accept an interruption.

There are three conditions of cancelling the spin wait state of the cache memory 25; (1) a snoop write hit from another CPU 21 to the cache memory 25, (2) an interrupt request, and (3) lapse of predetermined time (time out). The details of the conditions will be described later with reference to FIGS. 11 to 13.

Figures 10, 11:
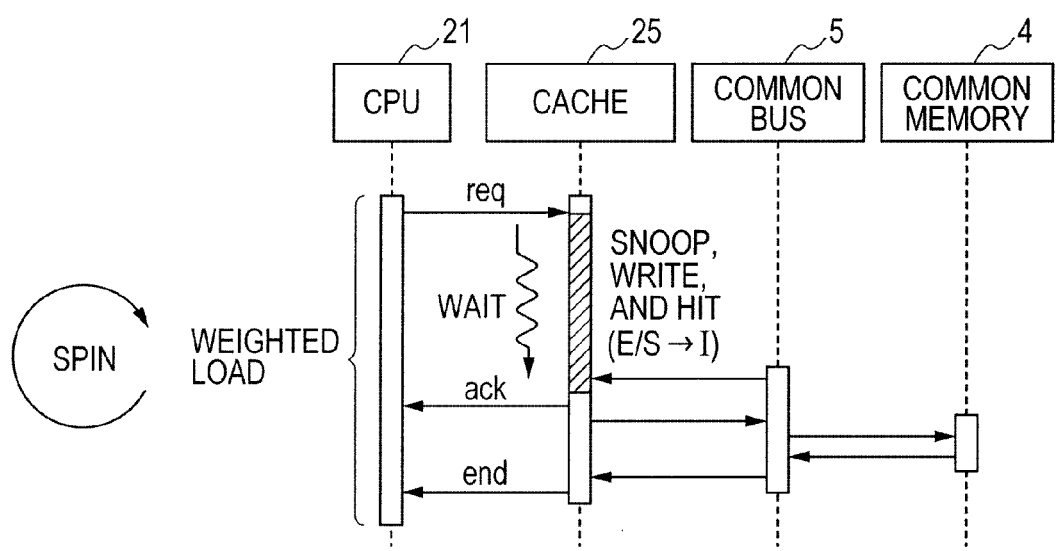
FIG. 10 is a diagram showing an example of a spinlock process code executed by the CPU 21 in the first embodiment of the invention.
FIG. 11 is a diagram for explaining a sequence of processing a weighted load instruction at the time of receiving a snoop access.

FIG. 10 is a diagram showing an example of a spinlock process code executed by the CPU 21 in the first embodiment of the invention. The spinlock process code is different from that of FIG. 4 only with respect to the point that the normal load instruction (LD instruction) is replaced with a weighted load instruction (LDS instruction).

In FIG. 10, as the spin wait instruction, the LDS instruction is written. When the CPU 21 executes the LDS instruction, a spin wait request is output to the cache memory 25. The cache memory 25 enters the spin wait state, the CPU 21 stalls until an acknowledge response is received from the cache memory 25, and does not execute the following bgtz instruction.

FIG. 11 is a diagram for explaining a sequence of processing the weighted load instruction upon reception of the snoop access. In the situation that the cache coherency by the snoop cache is maintained, even in the case where the memory access operation from the CPU 21 stops during the spin wait state, the cache memory 25 accepts a snoop access accompanying a cache memory access from another processor 21 and updates the cache state in order to maintain the cache coherency.

As an example of a cache coherency protocol, the case of a snoop cache using the MESI protocol in the MOESI protocol class will be described. A similar process can be realized also in the case of using the MOESI protocol obtained by adding an O (Owned) state to the above-described four states.

In FIG. 11, when the CPU 21 executes an LDS instruction, a memory read request (req) signal and a spin wait request signal are transmitted to the cache memory 25. When the request and the spin wait request are received from the CPU 21, the control unit 50 in the cache memory 25 sets the SWF 57 and enters the spin wait state. The pipeline is stalled, and the CPU 21 waits for an acknowledge signal from the cache memory 25. At this time, the state of a cache line in which a lock variable is stored is E (Exclusive) or S (Shared).

When another CPU 21 unlocks the lock variable, a snoop write hit access by writing to the lock variable occurs. In the cache memory 25, the cache line is invalidated by a snoop, and the state of the cache line changes to I (Invalid). When the snoop access is received, the control unit 50 in the cache memory 25 clears the SWF 57, returns to the normal operation state, and cancels the spin wait state. The control unit 50 transmits the acknowledge (ack) signal to the CPU 21 in order to notify the CPU 21 of reception of a read request.

When the acknowledge response is received from the cache memory 25, the CPU 21 returns from the state where the pipeline is stalled. In the cache memory 25, since the state of the cache line is the I (invalid) state, the read access fails and a read access to the common memory 4 via the common bus 5 is performed.

The cache memory 25 loads a lock variable from the common memory 4, transmits the loaded lock variable together with an end signal to the CPU 21, and completes the transaction. Therefore, in the case of the return from the spin wait state by a snoop access, the latest data written in the common memory 4 by the unlock process is already read, and the CPU 21 can execute the lock spin process accurately.

Figure 12:
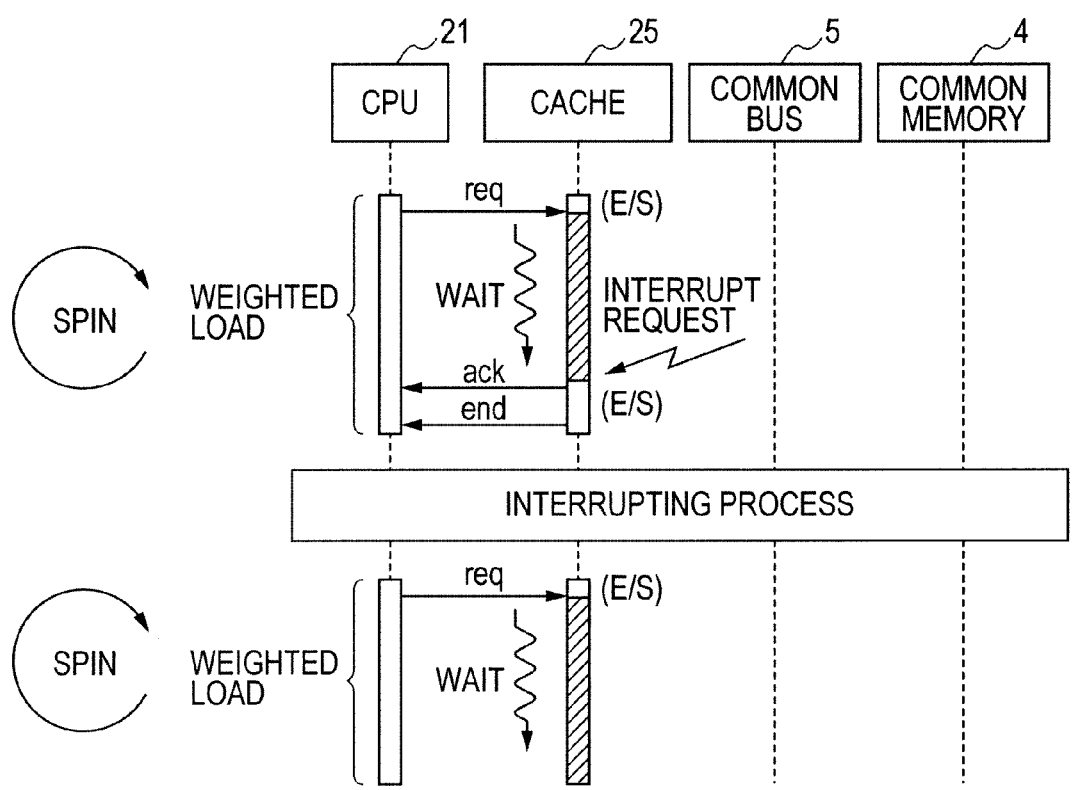
FIG. 12 is a diagram for explaining a sequence of processing a weighted load instruction at the time of receiving an interrupt request.

FIG. 12 is a diagram for explaining a sequence of processing a weighted load instruction at the time of reception of an interrupt request. When the CPU 21 executes an LDS instruction, a spin wait request signal and a memory read request (req) signal are transmitted to the cache memory 25. When the spin wait request is received from the CPU 21, the control unit 50 in the cache memory 25 sets the SWF 57 and shifts to the spin wait state. The pipeline is stalled and the CPU 21 waits for the acknowledge signal from the cache memory 25. At this time, the state of the cache line in which the lock variable is stored is E (Exclusive) or S (Shared).

After that, when the interrupt request is received, the control unit 50 in the cache memory 25 clears the SWF 57, resets to the normal operation state, and cancels the spin wait state. The control unit 50 transmits the acknowledge (ack) signal to the CPU 21 to notify the CPU 21 of reception of the read request.

When the acknowledge response is received from the cache memory 25, the CPU 21 resets from the state where the pipeline is stalled. Since the state of the cache line remains E (Exclusive) or S (Shared), the read access results in a cache hit, and the control unit 50 in the cache memory 25 transmits loaded data (lock variable) together with the end signal to the CPU 21 without accessing the common memory 4 to complete the transaction.

When the processor 21 is reset from the spin wait state, the interrupt request is received, and the CPU 21 executes the interrupt process. The CPU 21 returns from an interrupt handler, and continues the process of a program from an instruction subsequent to the weighted load instruction. However, a lock cannot be obtained, and the CPU 21 repeats execution of the spin wait loop instruction. In the spin wait loop, the CPU 21 executes the weighted load instruction again, and the cache memory 25 enters the spin wait state.

Figure 13:
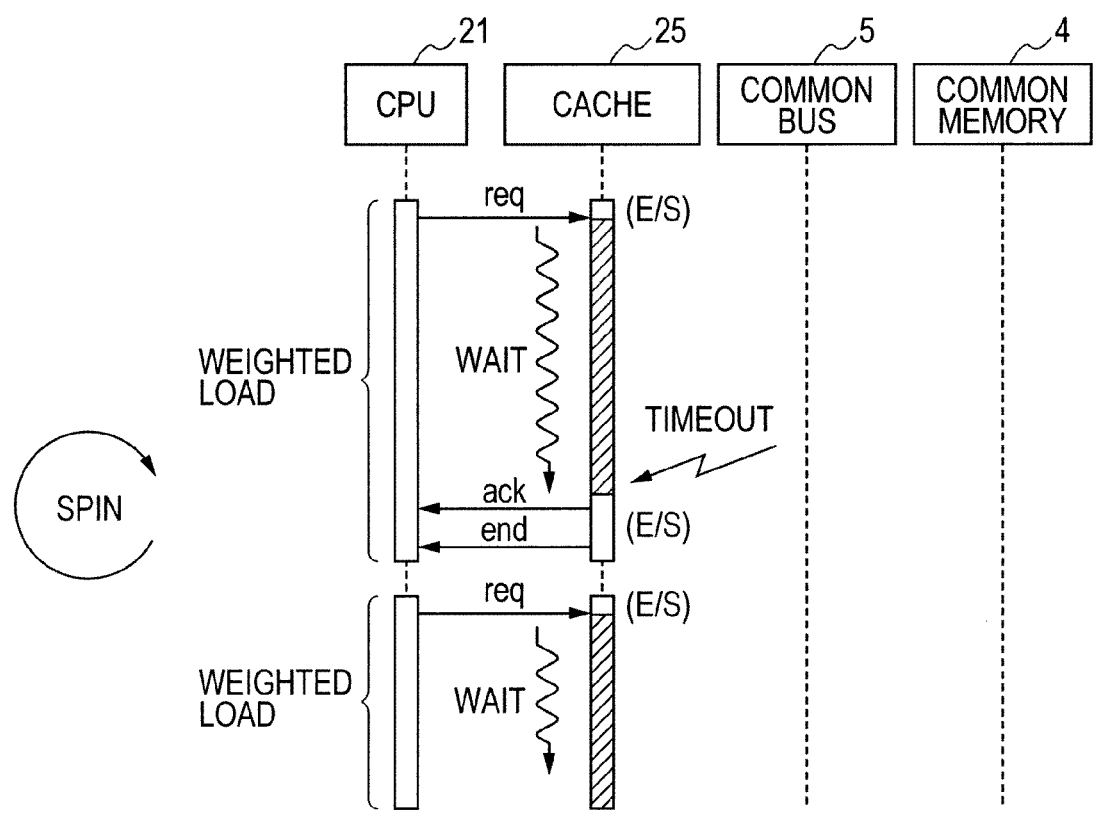
FIG. 13 is a diagram for explaining a sequence of processing a weighted load instruction when predetermined time lapses.

FIG. 13 is a diagram for explaining a sequence of processing a weighted load instruction after lapse of predetermined time. When the CPU 21 executes an LDS instruction, a spin wait request signal and a memory read request (req) signal are transmitted to the cache memory 25. When the spin wait request is received, the control unit 50 in the cache memory 25 sets the SWF 57 to shift to the spin wait state, and starts downcounting of the counter 58. The pipeline is stalled and the CPU 21 waits for the acknowledge signal from the cache memory 25. At this time, the state of the cache line in which the lock variable is stored is E (Exclusive) or S (Shared).

After that, when the control unit 50 in the cache memory 25 detects timeout of the counter 58, the control unit 50 clears the SWF 57, resets to the normal operation state, and cancels the spin wait state. The control unit 50 transmits the acknowledge (ack) signal to the CPU 21 to notify the CPU 21 of reception of the read request.

When the acknowledge response is received from the cache memory 25, the CPU 21 resets from the state where the pipeline is stalled. When the state of the cache line remains E (Exclusive) or S (Shared), the read access results in a cache hit, and the control unit 50 in the cache memory 25 transmits loaded data (lock variable) together with the end signal to the CPU 21 without accessing the common memory 4 to complete the transaction.

When the processor 21 is reset from the spin wait state, the CPU 21 continues the process of the program from the instruction subsequent to the weighted load instruction. However, in the case where a lock cannot be obtained, the CPU 21 repeats execution of the spin wait loop instruction. In the spin wait loop, the CPU 21 executes the weighted load instruction again, and the cache memory 25 enters the spin wait state. The process is repeated while execution of the spin wait loop continues.

In this case, the control unit 50 detects a timeout while fixing the wait time by using only the counter 58. It is also possible to set an arbitrary value in the reload register 59, reload the value of the reload register 59 on start of the spin wait state, and start the downcounting. In such a manner, the wait time can be varied.

Figure 14:
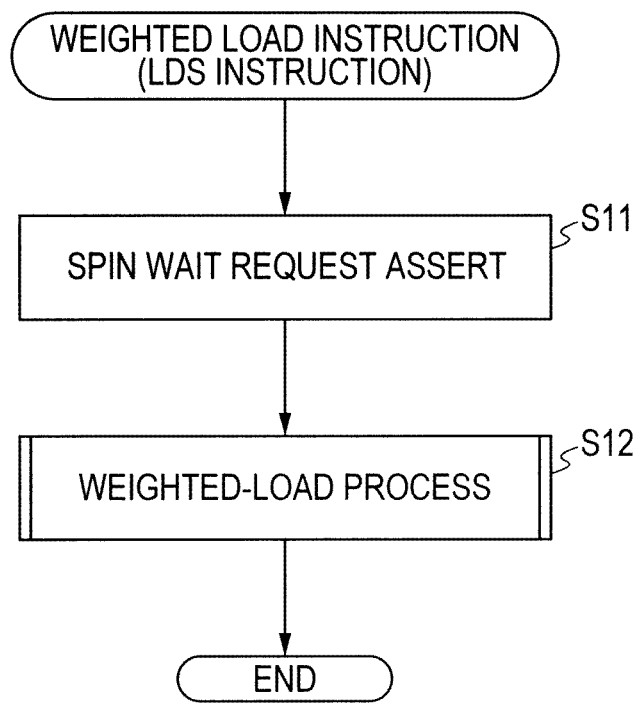
FIG. 14 is a diagram for explaining a flow of processing a weighted load instruction by the CPU 21.

FIG. 14 is a diagram for explaining a process flow of the weighted load instruction by the CPU 21. First, when the CPU 21 decodes the weighted load (LDS) instruction, the control unit 33 asserts the spin wait request signal for the cache memory 25 (S11).

Next, the CPU 21 performs a weighted load process (S12) and finishes the weighted load instruction. As described above, in the weighted load process, the control unit 33 in the CPU 21 transmits a read request signal to the cache memory and remains in the spin wait state until the acknowledge signal is received from the cache memory 25. After reception of the acknowledge signal, the control unit 33 receives load data sent together with the end signal from the cache memory 25.

Figure 15:
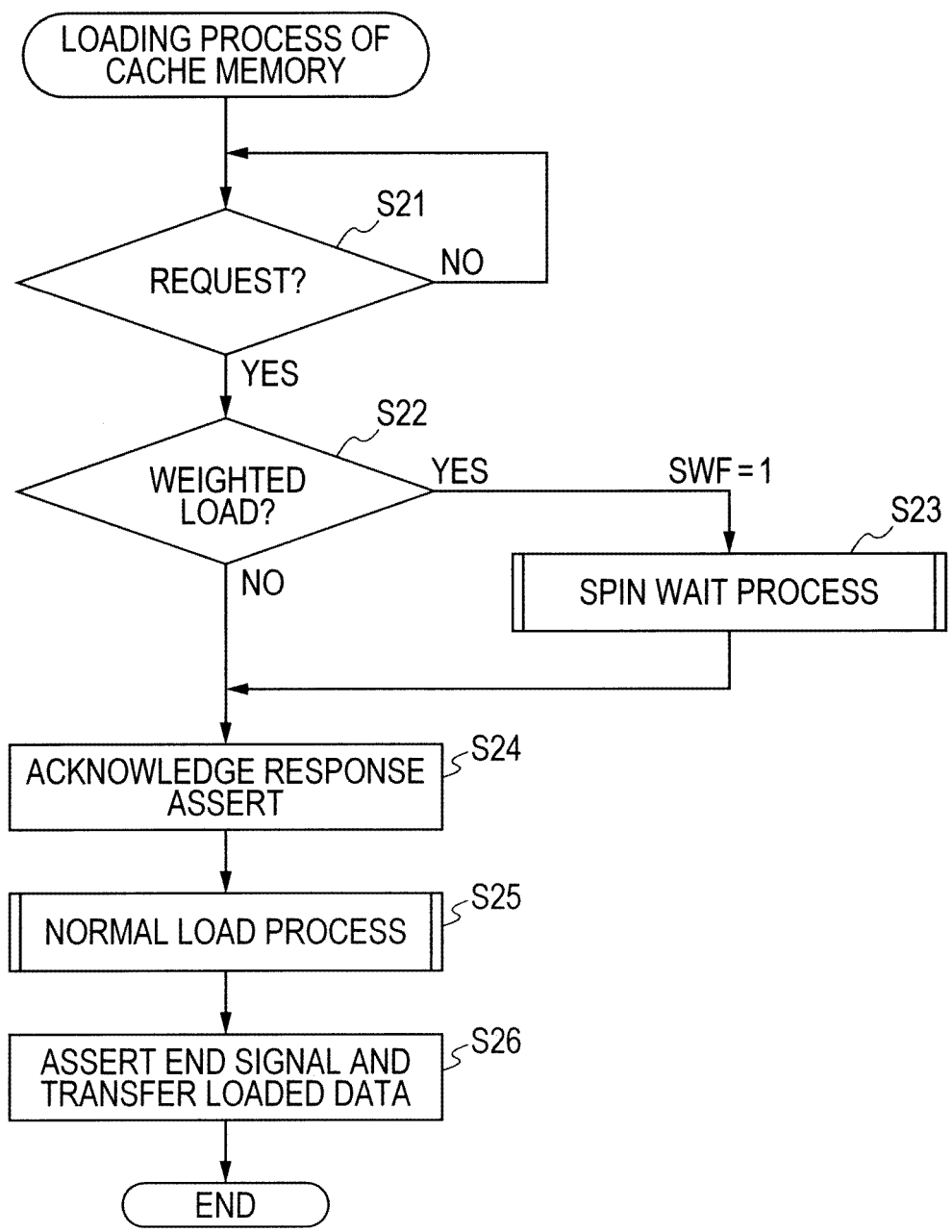
FIG. 15 is a diagram for explaining a flow of executing a loading process by the cache memory 25.

FIG. 15 is a diagram for explaining a flow of executing the load process by the cache memory 25. First, when a request signal is received (Yes in S21), the control unit 50 in the cache memory 25 determines whether the load instruction is a weighted load instruction or not in accordance with the spin wait request signal (SWF 57) (S22).

When the load instruction is the normal load instruction (LD instruction) (No in S22), the cache memory 25 moves to the process in step S24. When the load instruction is a weighted load instruction (Yes in S22), the control unit 50 performs spin wait process (S23) and advances to step S24. The spin wait process will be described later with reference to FIG. 16.

In step S24, the control unit 50 asserts the acknowledge response to the CPU 21 and performs normal load process (S25). Specifically, in the case of a cache hit, the control unit 50 loads data stored in the data memory 52. In the case of a cache miss, the control unit 50 loads data from the common memory 4 and stores a copy of the data to the data memory 52.

Finally, the control unit 50 asserts the end signal for the CPU 21, transfers the load data (S26), and finishes the load process.

Figure 16:
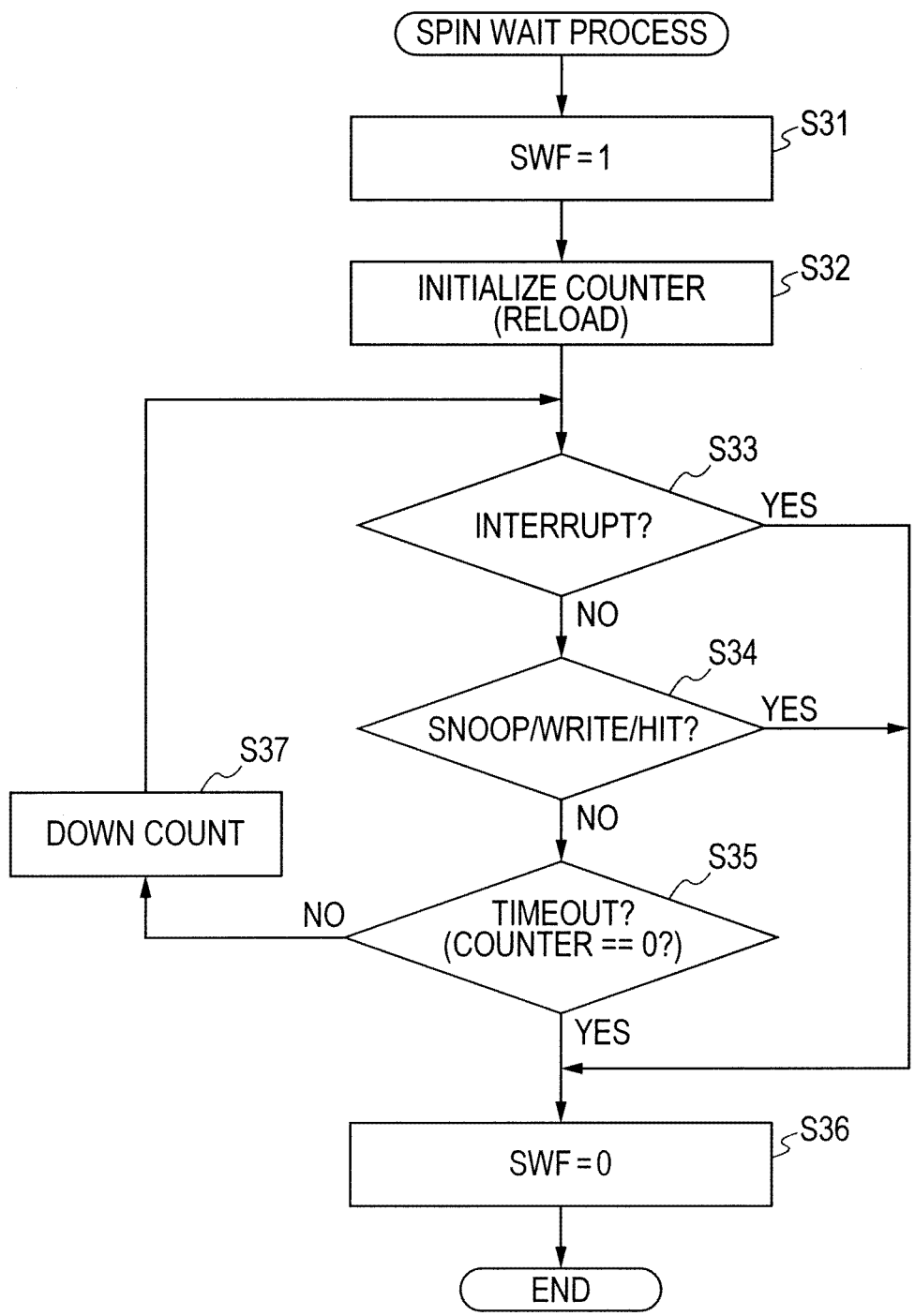
FIG. 16 is a diagram for explaining a flow of executing a spin wait process (S23) shown in FIG. 15.

FIG. 16 is a diagram for explaining a flow of executing the spin wait process (S23) shown in FIG. 15. First, the control unit 50 sets "1" in the SWF 57 (S31), and initializes the counter (S32). In the case where wait time is set in the reload register 59, the value is reloaded to the counter 58.

Next, the control unit 50 determines whether there is an interrupt request or not (S33). When there is an interrupt request (Yes in S33), the control unit 50 advances to the process in step S36. When there is no interrupt request (No in S33), the control unit 50 determines whether a snoop write hit occurs or not (S34). In the case where the snoop write hit occurs (Yes in S34), the control unit 50 moves to the process in step S36.

In the case where the snoop write hit does not occur (No in S34), the control unit 50 determines whether a timeout by the counter 58 occurs or not (S35). In the case where a timeout occurs (Yes in S35), the control unit 50 advances to the process in step S36. In the case where no timeout occurs (No in S35), the downcounting by the counter 58 is performed (S37), and processes subsequent to step S33 are repeated.

The control unit 50 clears the SWF 57 to "0" in step S36 and advances to the process in step S24 shown in FIG. 15.

As described above, in the data processor in the embodiment, in the process of reading a lock variable in the spin wait loop, by interrupting the acknowledge response from the cache memory 25, the pipeline of the CPU 21 is stalled, and the operation of the CPU 21 is stopped. Therefore, consumption of power by useless operations in the spin wait state of the CPU 21 can be reduced.

Also in the cache memory 25, an access to the tag 51 and the data memory 52 in the spin wait state can be stopped. Therefore, consumption of waste power which is caused by high-speed operation due to continuous cache hits can be prevented. Therefore, power consumption in the entire data processor in the spin wait state can be largely reduced.

After transmission of the spin wait request and the read request to the cache memory 25, the CPU 21 enters the spin wait state until the acknowledge response is transmitted from the cache memory 25. Consequently, it becomes unnecessary to monitor the spin wait state from the start to the end by the program process, so that the program process can be simplified.

The CPU 21 only notifies the cache memory 25 of execution of the spin wait instruction and the cache memory 25 performs spin wait process actively. Therefore, the circuit configuration of the CPU 21 can be simplified.

The cache memory 25 checks the spin cancellation wait by whether the snoop write access is hit or not, so that the circuit configuration of the cache memory 25 can be simplified.

In the case where an interrupt request is received, the cache memory 25 cancels the spin wait state and resets the CPU 21. Consequently, the CPU 21 can perform the interrupt process immediately, so that the interrupt response can be prevented from deteriorating.

Since return from the end of execution of the weighted load instruction in the spin wait loop is dynamically made using, a trigger, an interrupt or a snoop access from another CPU 21, it becomes unnecessary to set wait time longer than required. Therefore, it becomes unnecessary to set fixed wait time like in a conventional technique, and spinlock response can be made high.

Further, by providing an instruction dedicated to spin waiting, it becomes unnecessary to insert the normal instruction for spin waiting into the spin wait loop, and the code size in the spin lock process can be reduced. Usually, high-speed execution is requested for the spinlock process, so that the process is often realized as an in-line function or a macro instruction. Since the spinlock process is used in various places in an OS kernel and a code is expanded, there is a large advantage when the code size is reduced. When the code size becomes smaller, the number of instruction codes stored in the I (instruction) cache 23 becomes larger. Therefore, the processing speed can be made higher.

Second Embodiment

In the data processor in the first embodiment, when the CPU 21 executes the weighted load instruction, the CPU 21 transmits a spin wait request to the cache memory 25 to make the cache memory 25 enter the spin wait state. A data processor in a second embodiment is different from the data processor in the first embodiment only with respect to the point that a spin wait (SPIN) instruction is provided for the CPU 21, and the CPU 21 continuously holds the instruction until a load result becomes a designated value. Therefore, the detailed description of configurations and functions will not be repeated.

FIG. 17 is a diagram showing an example of a spinlock process code executed by the CPU 21 in the second embodiment of the invention. The spinlock process code is different from that of FIG. 10 only with respect to the point that a weighted load instruction (LDS instruction) and a bgtz instruction are replaced with a spin wait instruction (SPIN instruction).

The instruction is similar to the LDS instruction described in the first embodiment with respect to the point that when the CPU 21 executes the spin wait instruction, the CPU 21 and the cache memory 25 immediately enter the spin wait state, processes are stopped until the wait state is cancelled by the cache memory 25, and the loading process is performed after the spin wait state is cancelled.

The point different from the LDS instruction is that after the spin wait state is cancelled and the loading process is executed, when the load result does not satisfy an end condition designated by the SPIN instruction, the CPU 21 enters again the spin wait state and waits for cancellation of the spin wait state. The SPIN instruction end condition is that load data coincides with a designated operand or a fixed value.

In the SPIN instruction written in the loop L2 on the inside in FIG. 17, the spin wait state is continued until the value of the loaded lock variable becomes the immediate value "0" designated by the operand. When the value of the lock variable becomes "0", the instruction is branched to spin lock and an attempt to atomically obtain a lock is made in the loop on the outside indicated by L1.

Figure 18:
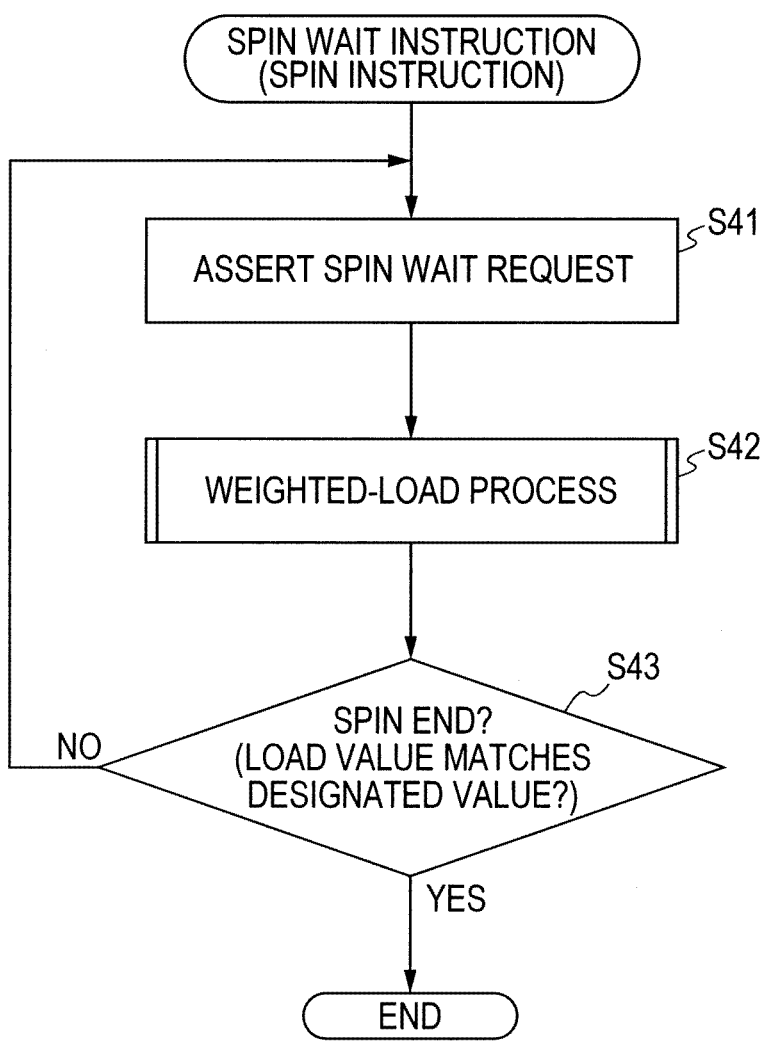
FIG. 18 is a diagram for explaining a flow of processing a spin wait instruction by the CPU 21.

FIG. 18 is a diagram for explaining a flow of processing a spin wait instruction by the CPU 21. First, when the CPU 21 executes a spin wait (SPIN) instruction, the control unit 33 asserts the spin wait request signal for the cache memory 25 (S41).

Next, the CPU 21 performs the weighted loading process (S42). As described above, in the weighted loading process, the control unit 33 of the CPU 21 transmits a read request signal to the cache memory 25 and performs a spin wait until an acknowledge signal is sent from the cache memory 25. After the acknowledge signal is received, the control unit 33 receives load data sent together with the end signal from the cache memory 25.

The control unit 33 in the CPU 21 determines end of the spin wait process depending on whether the value of load data coincides with the designated value or not (S43). In the case where the value of load data does not coincide with the designated value (No in S43), the control unit 33 returns to step S41 and repeats the subsequent process. When the value of load data and the designated value coincide with each other (Yes in S43), the spin wait process is finished.

When the CPU 21 receives an interrupt request during execution of the SPIN instruction, the CPU 21 interrupts execution of the SPIN instruction and accepts the interrupting process on completion of the weighted load process. After completion of the interrupting process, the CPU 21 continues execution of the SPIN instruction.

As described above, in the data processor in the embodiment, the spin wait process is performed until the value of the load data coincides with the predetermined value at the time of execution of the spin wait instruction. Consequently, in addition to the effects described in the first embodiment, the code size of the spinlock process can be further reduced.

Third Embodiment

A data processor in a third embodiment of the invention is different from the data processors in the first and second embodiments only with respect to the point that a mode of supplying clocks to the CPU 21 and the cache memory 25 is changed interlockingly with shift to the spin wait state and return from the spin wait state. Therefore, the detailed description of configurations and functions will not be repeated.

Figure 19:
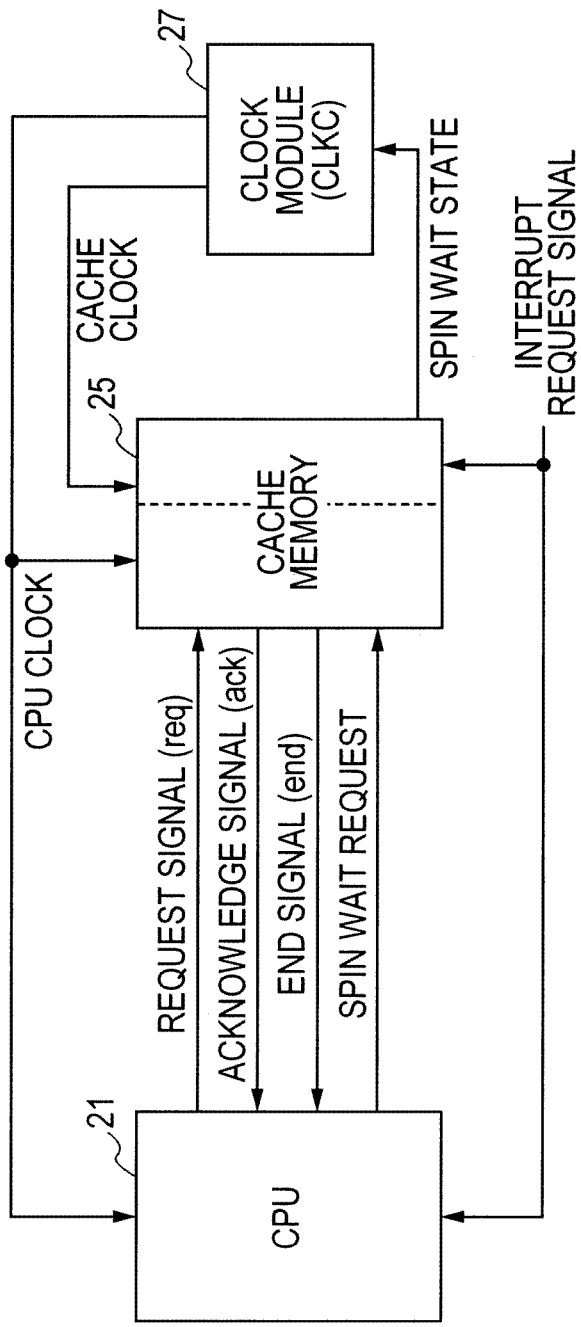
FIG. 19 is a block diagram showing a configuration example of a data processor in a third embodiment of the invention.

FIG. 19 is a block diagram showing a configuration example of the data processor in the third embodiment of the invention. The data processor is obtained by adding a clock module (CLKC) 27 to the data processor in the first embodiment shown in FIG. 6.

The cache memory 25 is divided into a part which operates in a CPU clock domain and a part which operates in a cache clock domain. At the time of shift to the spin wait state, the cache memory 25 notifies the clock module 27 of the fact that the cache memory 25 is in the spin wait state and makes the clock module 27 perform clock control.

When the cache memory 25 is in the normal operation state, the clock module 27 supplies a CPU clock to the CPU 21 and the cache memory 25, and supplies the cache clock to the cache memory 25.

When the cache memory 25 is in the spin wait state, the clock module 27 stops supplying the CPU clock to the CPU 21 and the part which operates in the CPU clock domain in the cache memory 25. At this time, the cache clock is supplied to the part which operates in the cache clock domain in the cache memory 25. Consequently, even in the case where the cache memory 25 is in the spin wait state, only the part which performs the spin wait control can continue operating.

As described above, in the data processor in the embodiment, when the cache memory 25 is in the spin wait state, supply of the CPU clock to the CPU 21 and the part which operates in the CPU clock domain in the cache memory 25 is stopped. Consequently, in addition to the effects described in the first and second embodiments, power consumption can be further reduced.

The mode is switched to the low power consumption mode in the spin wait state, so that the CPU 21 does not have to perform a clock control by the program process. Therefore, it becomes unnecessary to depend on the lower power consumption function by a program which tends to depend on the model.

It should be noted that the embodiments disclosed here are to be considered illustrative and not respective in all aspects. The scope of the invention is realized by the scope of claims more than the above description and all changes that fall within meets and bounds of the claims or equivalence are intended to come within the meaning of the claims.

What is claimed is:

1. A data processor comprising:
a plurality of processors;
a plurality of cache memories each corresponding to a respective processor of the plurality of processors, and each coupling the respective processor to a common memory,
wherein each cache memory of the plurality of cache memories receives a snoop access from a processor other than the corresponding processor and updates a cache state of its own cache line in response to the snoop access in order to maintain cache coherency,
wherein each processor of the plurality of processors executes a predetermined instruction in a spinlock process to output a spin wait request to the corresponding cache memory, and
wherein each cache memory includes a control unit which receives a read request from the corresponding processor, and outputs an acknowledge response to the read request to the corresponding processor in response to the updating of the cache state after receiving the spin wait request from the corresponding processor.

2. The data processor according to claim 1,
wherein each cache memory further includes a flag for controlling a spin wait state, and
wherein when the spin wait request is received from the corresponding processor, the control unit of the corresponding cache memory sets the flag and shifts to a spin wait state and, when the cache state is updated, clears the flag and shifts to a normal operation state.

3. The data processor according to claim 1, wherein when an interrupt request is received, the control unit of each cache memory outputs an acknowledge response to the read request to the corresponding processor in response to the interrupt request.

4. The data processor according to claim 1,
wherein each of the cache memories further includes a counter for counting the number of cycles at which outputting of the acknowledge response is stopped, and
wherein the control unit of each cache memory makes the counter start counting when the read request is received from the corresponding processor and, when the counter times out, outputs the acknowledge response to the corresponding processor.

5. The data processor according to claim 4,
wherein each of the cache memories further includes a register in which a reload value to be set in the counter is set, and
wherein the control unit of each cache memory makes the counter reload the reload value in the register and starts counting when the read request is received from the corresponding processor, and outputs the acknowledge response to the corresponding processor when the counter times out.

6. The data processor according to claim 1,
wherein each of the processors outputs the spin wait request to the corresponding cache at the time of executing a weighted load instruction, and
wherein the control unit of each cache memory shifts to a spin wait state when the spin wait request is received from the corresponding processor, shifts to a normal operation state when a predetermined condition is satisfied, executes a data loading process, and outputs the loaded data to the corresponding processor.

7. The data processor according to claim 1, further comprising clock control means for controlling supply of clocks,
wherein when the spin wait request is received from the corresponding processor, the control unit of each cache memory instructs the clock control means to stop clocks from being supplied to a circuit in a part of the corresponding processor and the corresponding cache memory.

8. The data processor according to claim 1, wherein pipeline processing is stalled in each of the processors until the acknowledge response is received after outputting the read request.

9. The data processor according to claim 1,
wherein each of the processors outputs the spin wait request to the corresponding cache memory at the time of executing a spin wait instruction,
wherein the control unit of each cache memory shifts to a spin wait state when the spin wait request is received from the corresponding processor, shifts to a normal operation state when a predetermined condition is satisfied, executes a data loading process, and outputs the loaded data to the corresponding processor and,
wherein when the loaded data received from the corresponding cache memory does not satisfy an end condition designated by the spin wait instruction, the processor outputs a spin wait request again to the corresponding cache memory and makes the corresponding cache memory shift to a spin wait state.

10. A data processor in which each of a plurality of processors is coupled to a common memory via a cache memory and cache coherency is maintained,
wherein each of the processors includes instruction executing means which executes a predetermined instruction at the time of performing a spinlock process and outputs a spin wait request to a corresponding cache memory,
wherein the cache memory includes control means which receives the spin wait request from a corresponding processor, and temporarily stops outputting an acknowledge response to a read request from the corresponding processor,
wherein the cache memory further includes a counter for counting the number of cycles at which outputting of the acknowledge response is stopped,
wherein the control means makes the counter start counting when a read request is received from the corresponding processor and, when the counter times out, outputs the acknowledge response to the corresponding processor,
wherein the cache memory further includes a register in which a reload value to be set in the counter is set, and
wherein the control means makes the counter reload the reload value in the register and starts counting when a read request is received from the corresponding processor, and outputs the acknowledge response to the corresponding processor when the counter times out.

11. A data processor in which each of a plurality of processors is coupled to a common memory is via a cache memory and cache coherency is maintained,
wherein each of the processors includes instruction executing means which executes a redetermined instruction at the time of performing a spinlock process and outputs a spin wait request to a corresponding cache memory,
wherein the cache memory includes control means which receives the spin wait request from a corresponding processor, and temporarily stops outputting an acknowledge response to a read request from the corresponding processor, wherein the instruction executing means outputs the spin wait request to the corresponding cache memory at the time of executing a spin wait instruction, wherein the control means shifts to a spin wait state when the spin wait request is received from the corresponding processor, shifts to a normal operation state when a predetermined condition is satisfied, executes a data loading process, and outputs the loaded data to the corresponding processor and, wherein when the loaded data received from the corresponding cache memory does not satisfy an end condition designated by the spin wait instruction, the instruction executing means outputs a spin wait request again to the corresponding cache memory and makes the corresponding cache memory shift to a spin wait state.

* * * * *